United States Patent
Wey et al.

(10) Patent No.: US 9,776,585 B2
(45) Date of Patent: Oct. 3, 2017

(54) BRACKET STIFFENING ASSEMBLY FOR A VEHICLE GRILLE

(71) Applicant: Nissan North America, Inc., Franklin, TN (US)

(72) Inventors: Chiray Wey, Farmington Hills, MI (US); Alfredo Dimichele, Macomb, MI (US); Christopher Prisby, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 160 days.

(21) Appl. No.: 14/795,486

(22) Filed: Jul. 9, 2015

(65) Prior Publication Data

US 2017/0008474 A1   Jan. 12, 2017

(51) Int. Cl.
B60R 19/52 (2006.01)

(52) U.S. Cl.
CPC ........ B60R 19/52 (2013.01); *B60R 2019/525* (2013.01)

(58) Field of Classification Search
CPC .. B60R 19/52; B60R 2019/525; B62D 25/084
USPC ...................................... 296/193.1
See application file for complete search history.

(56) References Cited

U.S. PATENT DOCUMENTS

| | | | | |
|---|---|---|---|---|
| 3,875,661 A | * | 4/1975 | Lidstrom ................ | B60R 19/52 267/140 |
| 5,100,188 A | * | 3/1992 | Stieg ..................... | B60K 11/08 180/68.6 |
| 8,157,303 B2 | | 4/2012 | Fortin | |
| 9,150,096 B2 | * | 10/2015 | Takanaga ............. | B60K 11/085 |
| 2002/0096378 A1 | * | 7/2002 | Kobayashi ............. | B60K 11/08 180/68.6 |
| 2007/0182174 A1 | * | 8/2007 | Nakayama ............. | B60R 19/52 293/115 |
| 2008/0079271 A1 | * | 4/2008 | Maruko ................. | B60R 19/52 293/102 |
| 2009/0001736 A1 | * | 1/2009 | Makino .................. | B60Q 5/00 293/115 |

(Continued)

FOREIGN PATENT DOCUMENTS

| | | | | |
|---|---|---|---|---|
| CA | 2303808 A1 | * | 5/1999 | ........... B62D 25/084 |
| DE | 4336591 A1 | * | 5/1994 | ............. B60R 19/52 |

(Continued)

*Primary Examiner* — H Gutman
(74) *Attorney, Agent, or Firm* — Global IP Counselors, LLP

(57) ABSTRACT

A bracket stiffening assembly for a vehicle grille includes a body member configured to be mounted to a central portion of the vehicle grille and first and second mounting members configured to be mounted to a perimeter portion of the vehicle grille. A first stiffening arm extends in a first direction between the first mounting member and the body member. A second stiffening arm extends in a second direction between the second mounting member and the body member. A third stiffening arm extends in the first direction between the first mounting member and the body member. The third stiffening arm is vertically spaced from the first stiffening arm. A fourth stiffening arm extends in the second direction between the second mounting member and the body member. The fourth stiffening arm is vertically spaced from the second stiffening arm.

15 Claims, 6 Drawing Sheets

(56) References Cited

U.S. PATENT DOCUMENTS

| | | | | |
|---|---|---|---|---|
| 2009/0261601 A1* | 10/2009 | Shin | ................... | B62D 25/084 293/115 |
| 2010/0244481 A1* | 9/2010 | Ohno | ................ | B60R 19/48 296/82 |
| 2011/0133498 A1* | 6/2011 | Huang-Tsai | ............ | B60R 19/52 293/115 |
| 2011/0204680 A1* | 8/2011 | Fortin | ................... | B60R 19/18 296/193.1 |
| 2013/0107046 A1* | 5/2013 | Forgue | .................. | B60R 11/04 348/148 |
| 2014/0061407 A1* | 3/2014 | Townson | ............... | E05B 79/04 248/205.1 |
| 2014/0062140 A1* | 3/2014 | Townson | ............ | B62D 25/085 296/193.09 |
| 2014/0132033 A1* | 5/2014 | Townson | ............ | B62D 25/084 296/193.1 |
| 2016/0200273 A1* | 7/2016 | Mohacsi | ................ | B60R 19/52 296/193.1 |
| 2016/0221522 A1* | 8/2016 | Abe | ....................... | B60R 19/52 |
| 2017/0008473 A1* | 1/2017 | Walters | .................. | B60R 19/52 |

FOREIGN PATENT DOCUMENTS

| | | | | |
|---|---|---|---|---|
| FR | 2851969 A1 * | 9/2004 | ........... | B60R 19/483 |
| FR | 2910412 A1 * | 6/2008 | ............ | B60R 19/52 |
| JP | 2003-182483 A | 7/2003 | | |
| JP | 2007-055311 A | 3/2007 | | |
| JP | EP 1939045 A2 * | 7/2008 | ............ | B60R 19/52 |
| JP | 2014198506 A * | 10/2014 | ........... | B60K 11/085 |

* cited by examiner

BRACKET STIFFENING ASSEMBLY FOR A VEHICLE GRILLE

BACKGROUND

Field of the Invention

The present invention generally relates to a bracket stiffening assembly for a vehicle grille. More specifically, the present invention relates to a vehicle grille assembly of a vehicle in which a bracket stiffening assembly is secured to an outer grille member to increase the rigidity of the vehicle grille assembly.

Background Information

A vehicle grille assembly includes a mesh member having mesh openings to allow airflow therethrough for engine cooling. However, increasing a size of the mesh openings to increase airflow can negatively impact the performance and appearance of the vehicle grille assembly. Additionally, aesthetic design changes to the vehicle grille assembly can negatively impact the performance of the vehicle grille assembly.

SUMMARY

In view of the state of the known technology, one aspect of the present invention is to provide a bracket stiffening assembly for a vehicle grille including a body member configured to be mounted to a central portion of the vehicle grille and first and second mounting members configured to be mounted to a perimeter portion of the vehicle grille. A first stiffening arm extends in a first direction between the first mounting member and the body member. A second stiffening arm extends in a second direction between the second mounting member and the body member. A third stiffening arm extends in the first direction between the first mounting member and the body member. The third stiffening arm is vertically spaced from the first stiffening arm. A fourth stiffening arm extends in the second direction between the second mounting member and the body member. The fourth stiffening arm is vertically spaced from the second stiffening arm.

Another aspect of the present invention is to provide a vehicle grille assembly including an outer grille member, a mesh member and a bracket stiffening assembly. The outer grille member has a perimeter portion defining an opening. A mesh member is secured to the outer grille and has mesh to cover the outer grille opening. The mesh member has a top end, a bottom end and a central portion disposed therebetween. The bracket stiffening assembly includes a body member mounted to the central portion of the mesh member, and first and second mounting members mounted to the perimeter portion of the outer grille member. First and second stiffening arms extend between the body member and the first and second mounting members, respectively. The first stiffening arm extends across the outer grille opening and is spaced from the top and bottom ends of the mesh member. The second stiffening arm extends across the outer grille opening and is spaced from the top and bottom ends of the mesh member.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
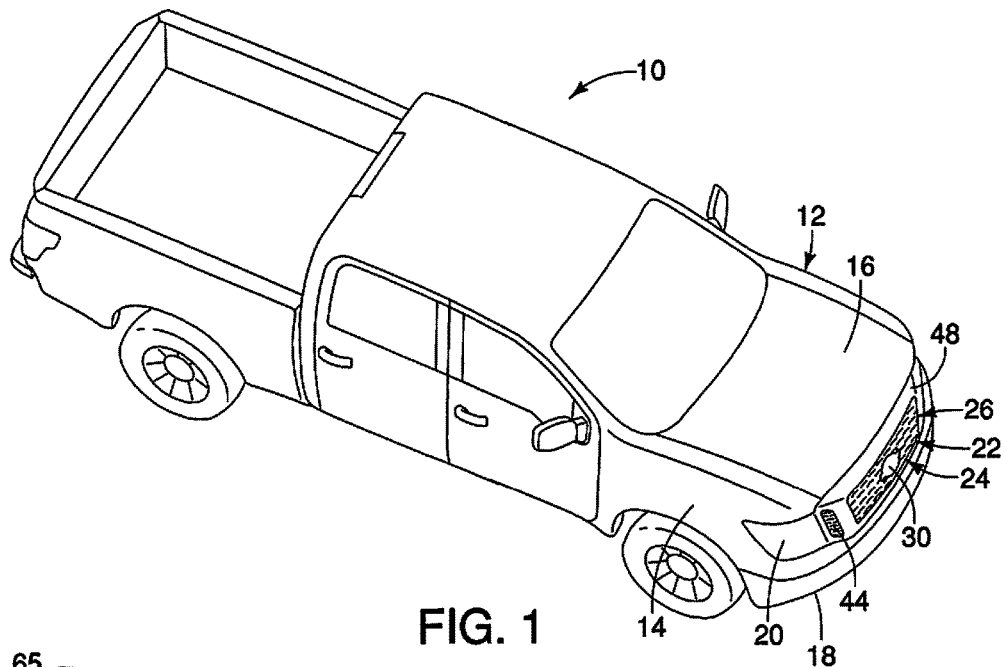
FIG. 1 is a perspective view of a vehicle grille assembly in accordance with an exemplary embodiment of the present invention in which a bracket stiffening assembly is disposed behind an outer grille member.

Selected exemplary embodiments will now be explained with reference to the drawing figures. It will be apparent to those skilled in the art from this disclosure that the following descriptions of the exemplary embodiments are provided for illustration only and not for the purpose of limiting the invention as defined by the appended claims and their equivalents.

Referring initially to FIG. 1, a vehicle 10 is illustrated in accordance with an exemplary embodiment of the present invention. The vehicle 10 includes various conventional elements such as a body structure 12, which includes fenders 14, a hood 16, a bumper assembly 18 and headlamp assemblies 20. These elements are peripheral to a vehicle grille assembly 22, such that further description is omitted for the sake of brevity.

Figure 4:
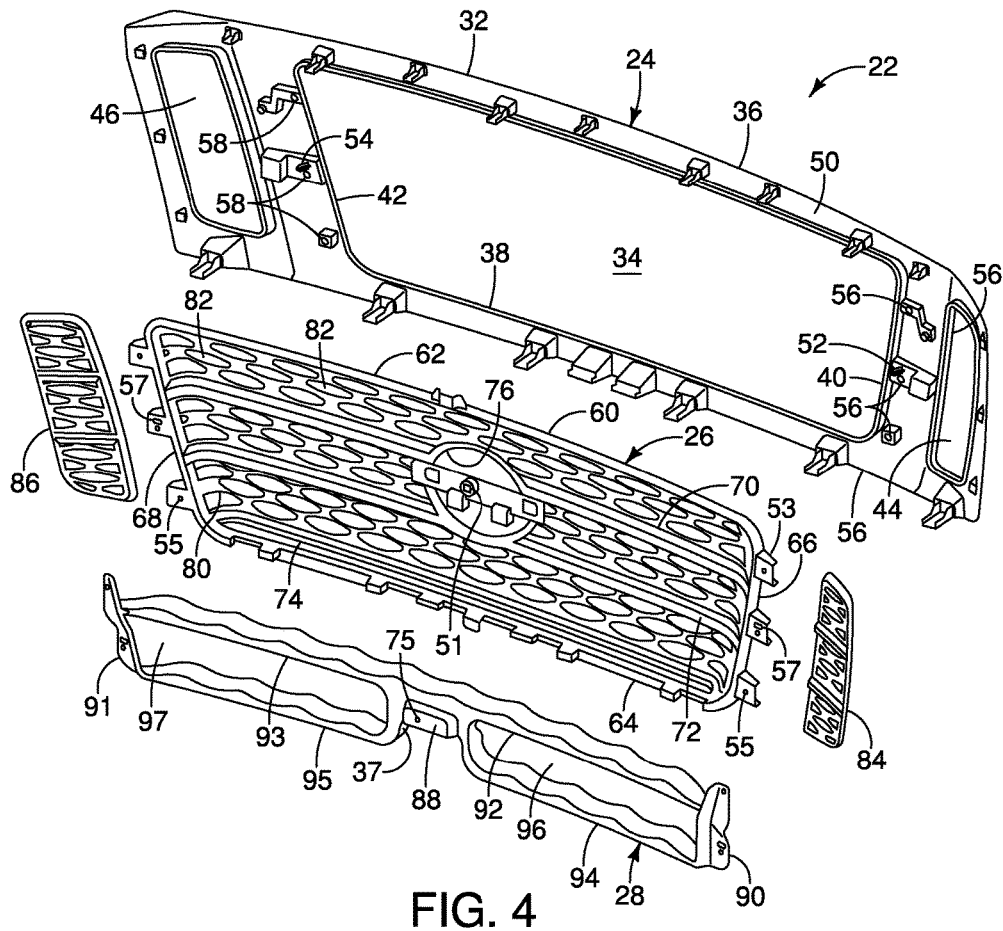
FIG. 4 is a rear exploded perspective view of the vehicle grille assembly of FIG. 1.
Figure 5:
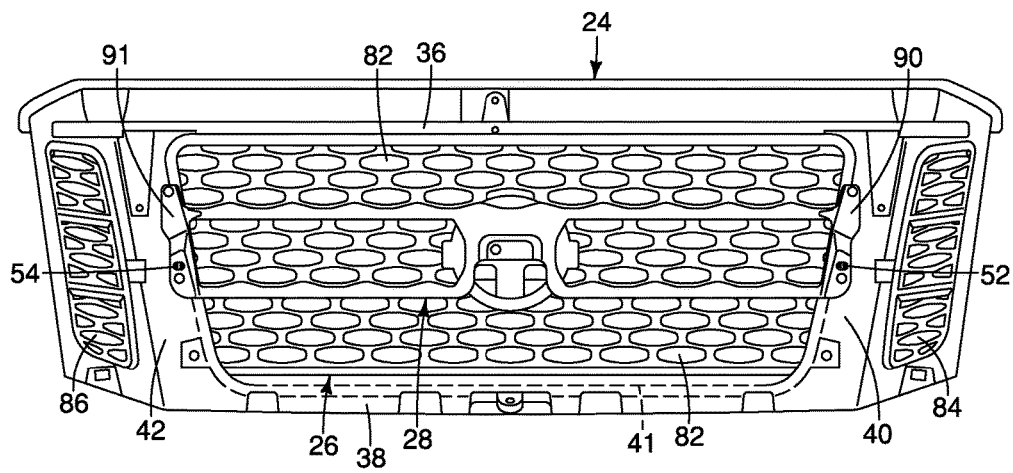
FIG. 5 is a rear view of the bracket stiffening assembly secured to the outer grille member of the vehicle grille assembly of FIG. 1.

The vehicle grille assembly 22 includes an outer grille member 24, a cover, or mesh, member 26 and a stiffening bracket assembly 28, as shown in FIGS. 1, 4 and 5. As shown in FIG. 1, for example, an emblem 30 can be mounted to the vehicle grille assembly 22.

The outer grille member 24 has a perimeter portion 32 defining an opening 34, as shown in FIG. 4. The perimeter portion 32 has a top portion 36, a bottom portion 38 and opposing first and second side portions 40 and 42 connecting the top and bottom portions 36 and 38, such that the defined opening 34 is substantially rectangular. Outer openings 44 and 46 can be further defined in the first and second side portions 40 and 42 of the outer grille member 24.

The perimeter portion 32 of the outer grille member 24 has an outer surface 48 and an inner surface 50, as shown in FIGS. 1 and 4. The outer surface 48 faces externally of the vehicle 10, and the inner surface 50 faces toward an engine compartment (not shown) of the vehicle 10. A first locating member 52 extends outwardly from the first side portion 40. A second locating member 54 extends outwardly from the second side portion 42. A plurality of fastener openings 56 and 58 are disposed on the first and second side portions 40 and 42. As shown in FIG. 4, three fastener openings 56 are disposed on the first side portion 40 and three fastener openings 58 are disposed on the second side portion 42.

The mesh member 26 has a perimeter portion 60, as shown in FIG. 4. The perimeter portion 60 of the mesh member 26 has a top end 62, a bottom end 64 and opposing first and second side ends 66 and 68. A plurality of laterally extending slats 70, 72 and 74 extend between the first and second side ends 66 and 68. As shown in FIG. 4, three slats 70, 72 and 74 extend between the first and second side ends 66 and 68, although any suitable number of slats can be used. A central portion 76 is substantially centrally located within the perimeter portion 60 of the mesh member 26. The central portion 76 is configured to receive an emblem 30, as shown in FIG. 1. A fastener opening 51 is disposed in the central portion 76 of the mesh member 26. A plurality of mounting tabs 53 extend outwardly from the perimeter portion 60 of the mesh member 26. Each mounting tab 53 includes at least one fastener opening 55. The mounting tabs 53 can also include a locator opening 57.

A mesh 80 extends within the areas defined by the perimeter portion 60, the central portion 76 and the laterally extending slats 70, 72 and 74, as shown in FIG. 4. The mesh 80 defines a plurality of mesh openings 82 through which air can flow into the engine compartment.

Outer mesh members 84 and 86 are configured to be received by the outer openings 44 and 46 in the outer grille member 24. The outer mesh members 84 and 86 are substantially similar to the mesh member 26 but without a central portion configured to receive the emblem.

Figure 2:
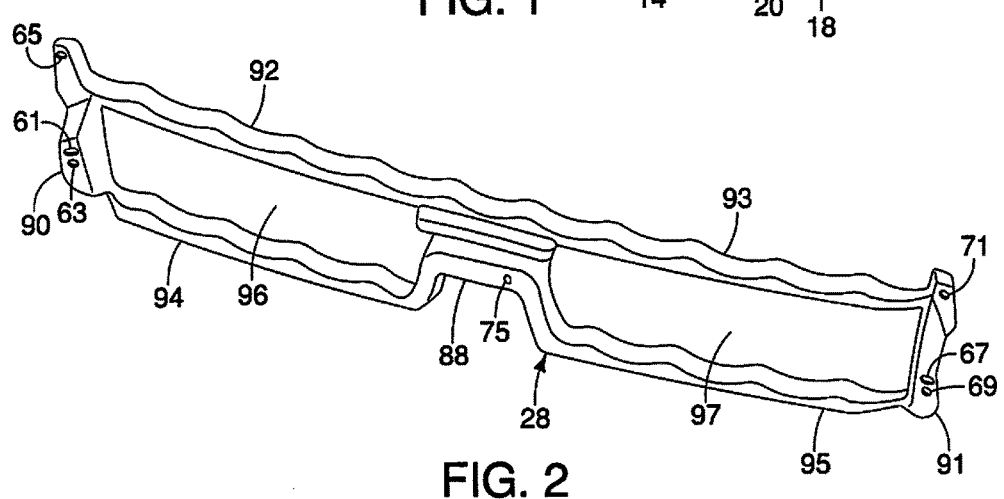
FIG. 2 is a front perspective view of the bracket stiffening assembly of FIG. 1.
Figure 3:
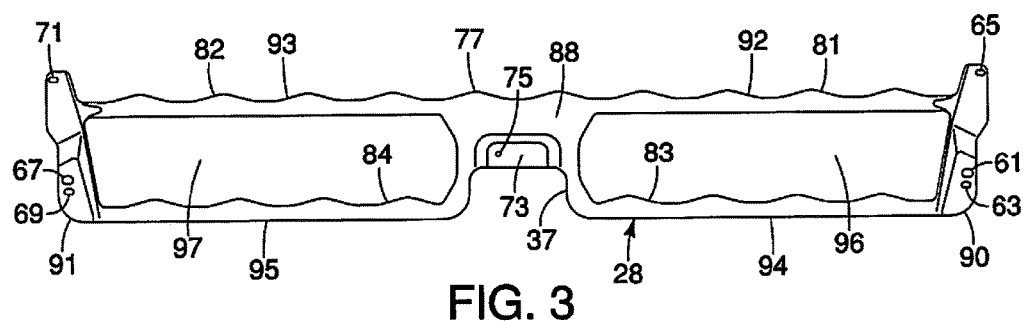
FIG. 3 is a rear view of the bracket stiffening assembly of FIG. 1.

The bracket stiffening assembly 28, as shown in FIGS. 2 and 3, includes a body member 88 and first and second mounting members 90 and 91. A first stiffening arm 92 extends from the body member 88 to the first mounting member 90. A second stiffening arm 93 extends from the body member 88 to the second mounting member 91. A third stiffening arm 94 extends from the body member 88 to the first mounting member 90. A fourth stiffening arm 95 extends from the body member 88 to the second mounting member 91. The first and third stiffening arms 92 and 94 preferably extend in a first direction from the body member 88 to the first mounting member 90. The second and fourth stiffening arms 93 and 95 preferably extend in a second direction, which is preferably substantially opposite to the first direction, from the body member 88 to the second mounting member 91. Although the stiffening bracket assembly 28 is shown having four stiffening arms, any suitable number of stiffening arms can be used. For example, the stiffening bracket assembly can have two stiffening arms in which one stiffening arm extends from the body member 88 to each of the mounting members 90 and 91, or the stiffening bracket assembly can have five stiffening arms in which a fifth stiffening arm extends from the first mounting member 90 to the second mounting member 91 (shown in phantom lines in FIG. 5).

As shown in FIGS. 2 and 3, the first stiffening arm 92 is vertically spaced from the third stiffening arm 94. The second stiffening arm 93 is vertically spaced from the fourth stiffening arm 95. The body member 88, the first stiffening arm 92, the first mounting member 90 and the third stiffening arm 94 define a first open area 96. The body member 88, the second stiffening arm 93, the second mounting member 91 and the fourth stiffening arm 95 define a second open area 97. The first and second open areas 96 and 97 are disposed on opposite sides of the body member 88. Upper surfaces 81, 82, 83 and 84 of each of the stiffening arms 92, 93, 94 and 95, respectively, are contoured.

The first mounting member 90 has a locator opening 61 and a first fastener opening 63, as shown in FIG. 3. The first mounting member 90 can have a second fastener opening 65. The first fastener opening 63 is disposed adjacent the locator opening 61 and the second fastener opening 65 is spaced from the locator opening 61.

The second mounting member 91 has a locator opening 67 and a first fastener opening 69, as shown in FIG. 3. The second mounting member 91 can have a second fastener opening 71. The first fastener opening 69 is disposed adjacent the locator opening 67 and the second fastener opening 71 is spaced from the locator opening 67.

The body member 88 has a recessed portion therein 73. A fastener opening 75 is disposed in the recessed portion 73 of the body member 88. An upper surface 77 of the body member 88 is contoured such that the upper surfaces 81, 77 and 82 define a continuously contoured surface that extends from the first mounting member 90 to the second mounting member 91.

Figure 7:
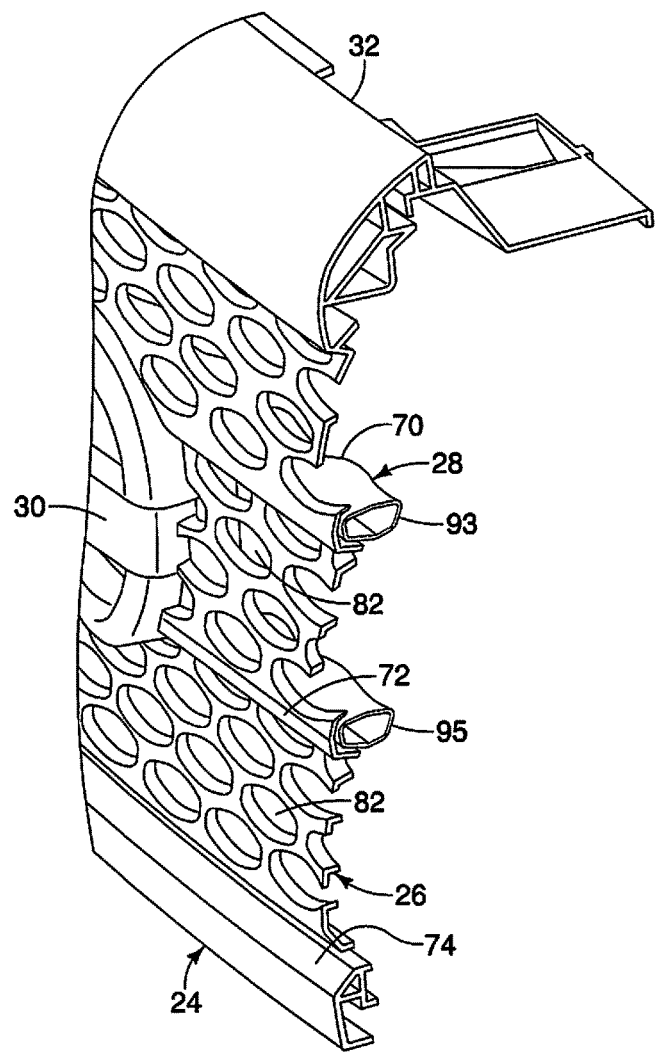
FIG. 7 is a perspective view in cross-section of the bracket stiffening assembly secured to the grille assembly of FIG. 5.
Figure 8:
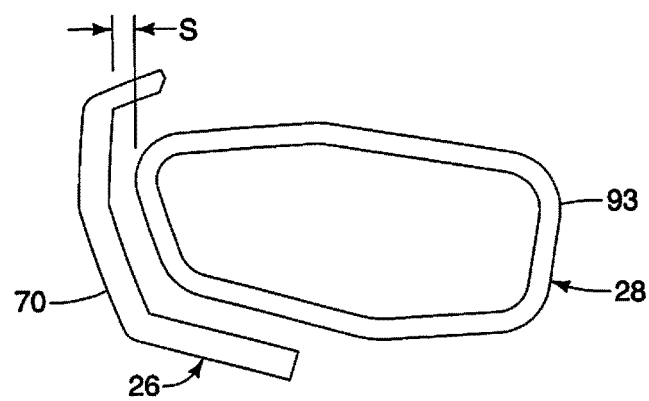
FIG. 8 is an elevational view in cross-section of a stiffening arm of the bracket stiffening assembly spaced from a laterally extending slat of the mesh member.

The bracket stiffening assembly 28 is preferably integrally formed as a unitary member in any suitable manner, such as by blow molding. The stiffening arms, such as the third and fourth stiffening arms 93 and 95 shown in FIGS. 7 and 8, are hollow when the bracket stiffening assembly 28 is made by a blow molding process. The bracket stiffening assembly 28 can be made of any suitable material, such as plastic or metal. The outer grille member 24 and the mesh member 28 can be made of any suitable material, such as plastic or metal. The mesh member 28 can be painted, plated, and/or adorned with chrome, gold or other colored finishes adhered thereto for aesthetic purposes.

Figure 6:
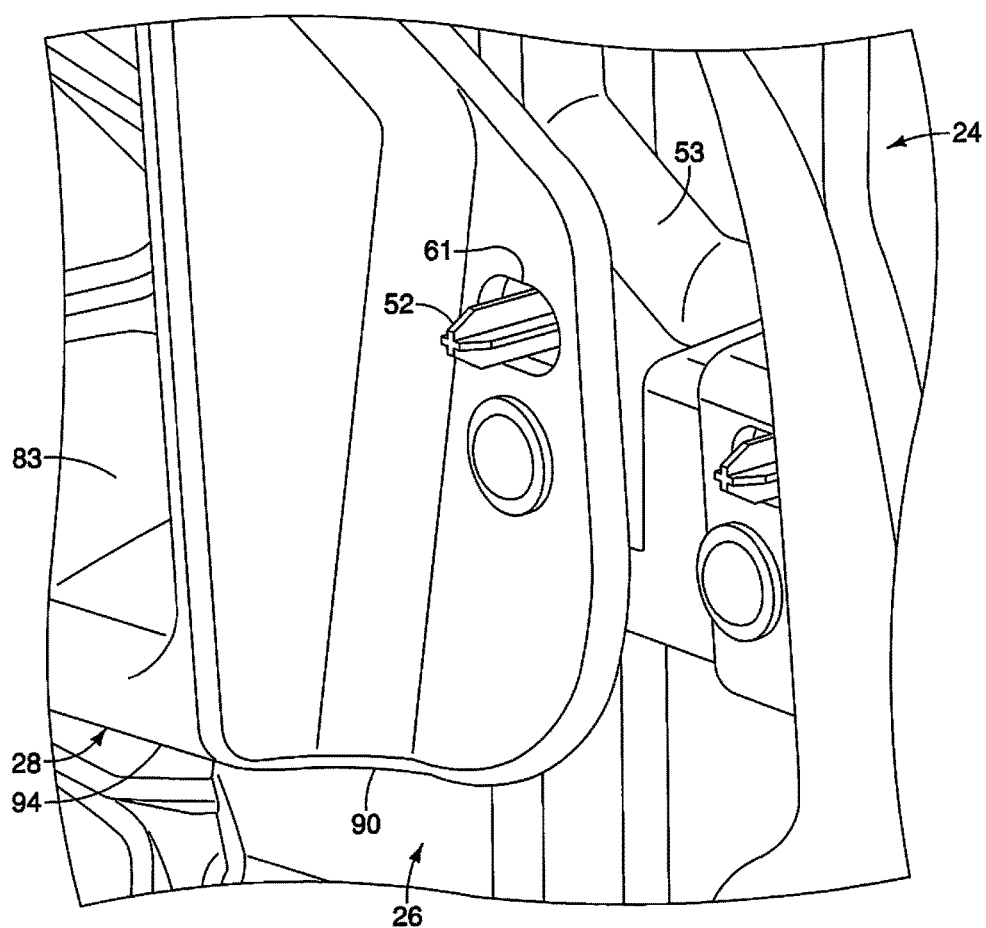
FIG. 6 is an enlarged perspective view of a locating member of the outer grille member received by a mesh member and by a mounting member of the bracket stiffening assembly.

The outer grille member 24 is secured to the vehicle body structure 12 in a conventional manner. The outer grille member 24 is secured to the front of the body structure 12 between front ends of the fenders 14 and above the bumper assembly 18, as shown in FIG. 1. The locator openings 57 of the mounting tabs 53 of the mesh member 26 receive the first and second locator members 52 and 54, as shown in FIGS. 5 and 6, thereby properly positioning the mesh member 26 with respect to the outer grille member 24. The fastener openings 55 in the mounting tabs 53 of the mesh member 26 are aligned with the fastener openings 56 and 58 in the perimeter portion 32 of the outer grille member 24. The perimeter portion 60 of the mesh member 26 overlies the perimeter portion 32 of the outer grille member 24 such that the mesh member 26 completely covers the outer grille member opening 34. The outer mesh members 84 and 86 are secured to the outer grille member 24 in a conventional manner such that the entirety of the side openings 44 and 46 in the outer grille member 24 are covered by the outer mesh members 84 and 86. The mesh member 26 is secured on a rear side of the outer grille member 24.

The first and second locator openings 61 and 67 in the first and second mounting members 90 and 91 of the bracket stiffening assembly 28 receive the first and second locator members 52 and 54 of the outer grille member 24, thereby properly positioning the bracket stiffening assembly 28 with respect to the outer grille member 24 and the mesh member 26. Fasteners 59 are inserted through fastener openings 63, 65, 69 and 71 of the bracket stiffening assembly 28, through the fastener openings 55 in the mounting tabs 53 of the mesh member 26 and into the fastener openings 58 of the outer grille member 24. Another fastener 59 can be inserted through the fastener opening 75 in the body member 88 of the bracket stiffening assembly 28, through the fastener opening 51 in the central portion 76 of the mesh member 26 and into a fastener opening in the emblem 30. The bracket stiffening assembly 28 is secured on rear sides of the outer grille member 24 and the mesh member 26.

As shown in FIGS. 1 and 5, the bracket stiffening assembly 28 is substantially concealed from view in a horizontal direction on an outer side of the outer grille member 24. The bracket stiffening arms 92, 93, 94 and 95 are disposed behind the laterally extending slats 70 and 72 of the mesh member 26. The upper surfaces of the stiffening arms 92, 93, 94 and 95 are contoured to match the shape of the mesh openings 82 to facilitate substantially concealing the stiffening bracket assembly 28 from view in a horizontal direction on an outer side of the outer grille member 24. The bracket stiffening assembly 28 provides increased rigidity to the vehicle grille assembly 22.

In another exemplary embodiment, as shown in FIG. 5, a fifth stiffening arm 41 extends from the first mounting member 90 to the second mounting member 91. The fifth stiffening arm 41 has a shape corresponding to the bottom portion 38 and the side portions 40 and 42 of the perimeter portion 32 of the outer grille member 24, thereby facilitating substantially concealing the fifth stiffening arm 41 from view in a horizontal direction on an outer side of the outer grille member 24. The fifth stiffening arm 41 is disposed behind the perimeter portion 32 of the outer grille member 26 such that the fifth stiffening arm 41 does not impair the flow of air through the vehicle grille assembly 22.

As shown in FIG. 5, the stiffening arms 92, 93, 94 and 95 are vertically spaced from the top end 62 and the bottom end 64 of the perimeter portion 60 of the mesh member 26. The stiffening arms 92, 93, 94 and 95 are vertically spaced from the top portion 36 and the bottom portion 38 of the perimeter portion 32 of the outer grille member 24. The stiffening arms 92, 93, 94 and 95 extend across the outer grille opening 34. The stiffening arms 92, 93, 94 and 95 are disposed behind the laterally extending slats 70 and 72 of the mesh member 26 and have contoured surfaces corresponding to the shape of the mesh openings 82 such that the bracket stiffening member does not impair the flow of air through the vehicle grille assembly 22. The first and second open areas 96 and 97 are disposed in the outer grille member opening 34 to allow air to flow therethrough.

As shown in FIGS. 7 and 8, the stiffening arms 92, 93, 94 and 95 are horizontally spaced from the laterally extending slats 70 and 72 of the mesh member 26. An inner surface of the laterally extending slat 70 is spaced from an outer surface of the stiffening arm 93 by a horizontal distance S. The horizontal spacing S limits rearward deflection of the mesh member 26.

Figure 9:
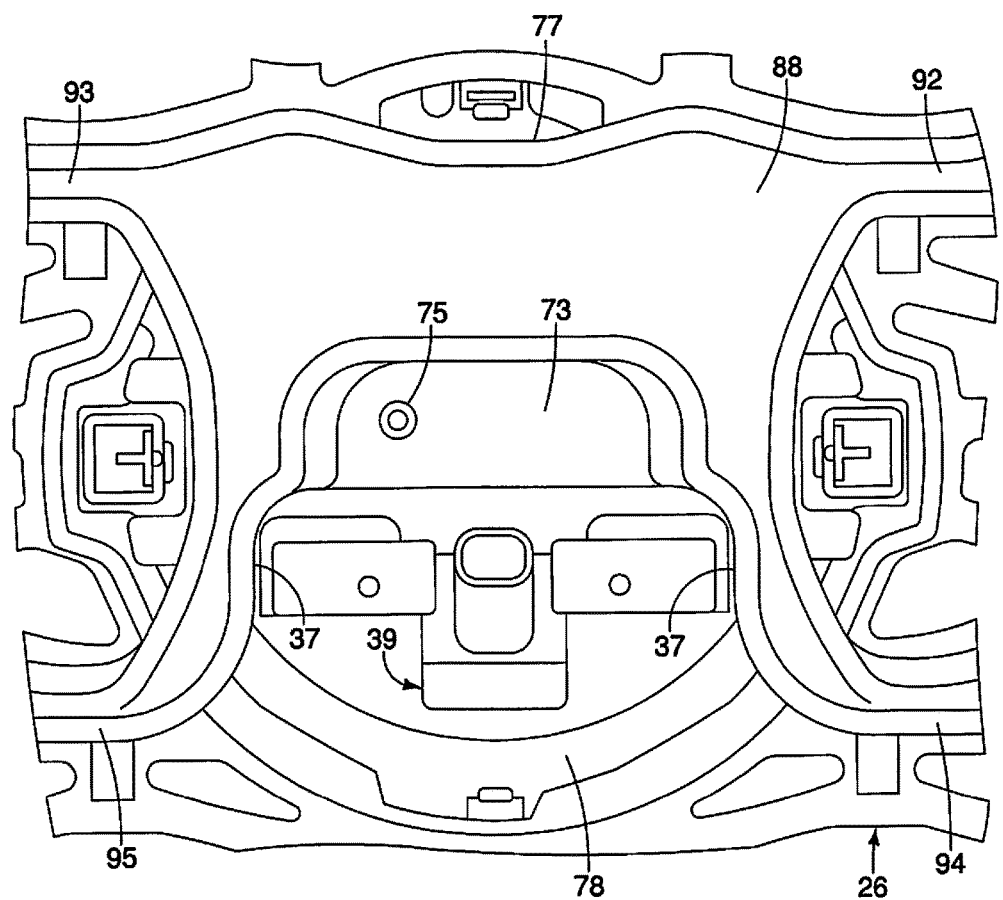
FIG. 9 is a rear view of a camera secured to the vehicle grille assembly of FIG. 5.
Figure 10:
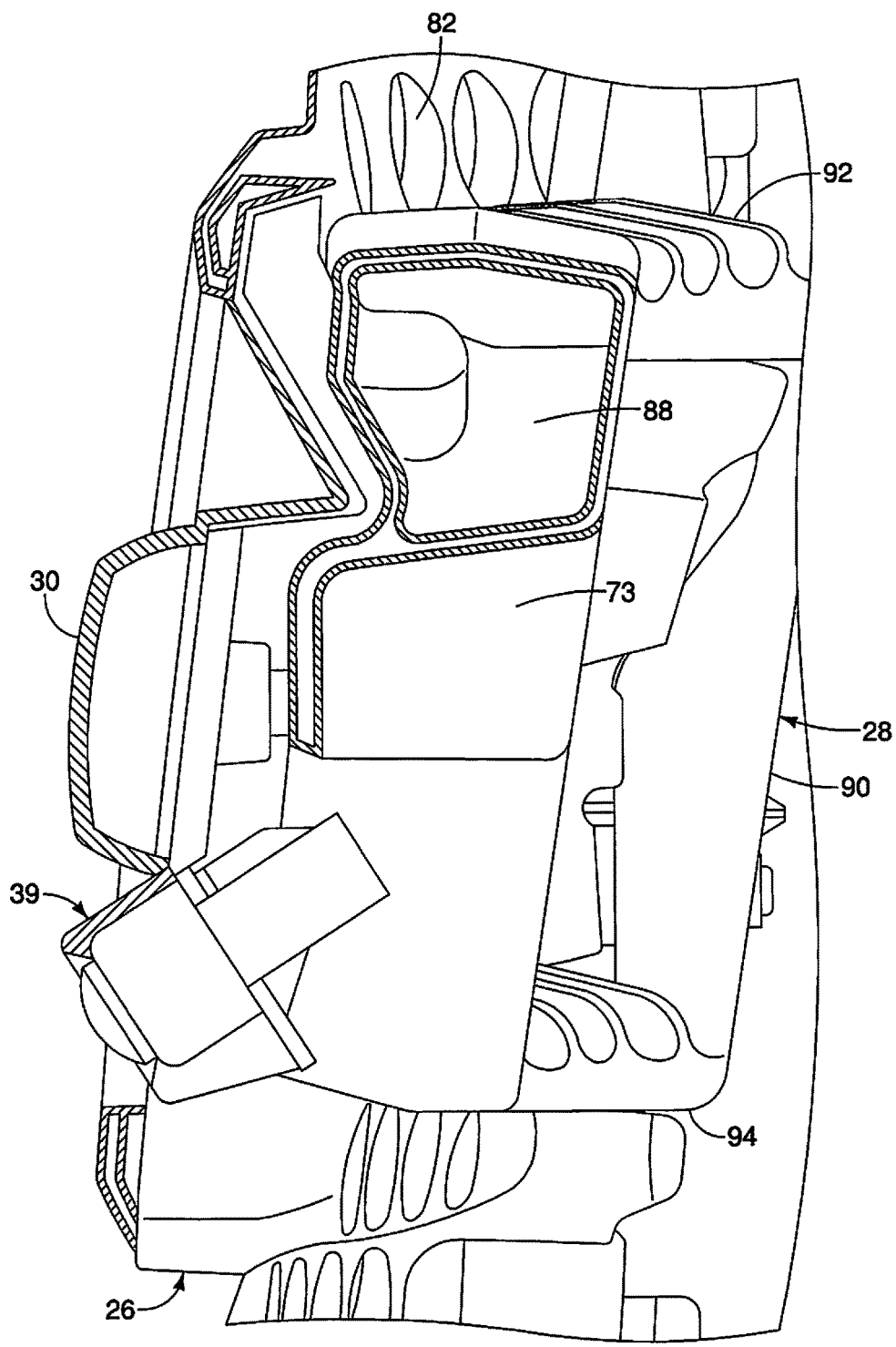
FIG. 10 is an elevational view in cross-section of the camera secured to the vehicle grille assembly of FIG. 9.

A U-shaped recess 37 in the bracket stiffening assembly 28 is defined by the third and fourth stiffening arms 94 and 95 and the body member 88, as shown in FIGS. 3 and 4. The U-shaped recess 37 is configured to accommodate a camera 39, as shown in FIGS. 9 and 10. The camera 39 is secured to the emblem 30 in any suitable manner such that the camera 39 is exposed externally of the emblem 30.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle including the bracket stiffening assembly.

The terms of degree such as "substantially", "about" and "approximately" as used herein mean a reasonable amount of deviation of the modified term such that the end result is not significantly changed.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle grille assembly, comprising:
    an outer grille member having a perimeter portion defining an opening;
    a cover member secured to the outer grille to cover the outer grille opening, the cover member having a top end, a bottom end, a central portion disposed therebetween and at least one opening; and
    a bracket stiffening assembly, the bracket stiffening assembly including
    a body member mounted to the central portion of the cover member;
    a first mounting member mounted to the perimeter portion of the outer grille member;
    a second mounting member mounted to the perimeter portion of the outer grille member;
    a first stiffening arm extending between the first mounting member and the body member, the first stiffening arm extending across the outer grille opening and being vertically spaced from the top and bottom ends of the cover member; and
    a second stiffening arm extending between the second mounting member and the body member, the second stiffening arm extending across the outer grille opening and being vertically spaced from the top and bottom ends of the cover member.

2. The vehicle grille assembly according to claim 1, wherein
    a third stiffening arm extends between the first mounting member and the body member; and
    a fourth stiffening arm extends between the second mounting member and the body member.

3. The vehicle grille assembly according to claim 2, wherein
the cover member has a plurality of openings, the upper surfaces of the first, second, third and fourth stiffening arms being contoured to substantially correspond to a shape of the the plurality of openings.

4. The vehicle grille assembly according to claim 1, wherein
the bracket stiffening assembly is substantially concealed from view in a horizontal direction on an outer side of the outer grille member.

5. The vehicle grille assembly according to claim 1, wherein
the bracket assembly is integrally formed as a unitary member by blow molding.

6. The vehicle grille assembly according to claim 2, wherein
each of the first, second, third and fourth stiffening arms is spaced from the at least one opening in a horizontal direction.

7. The vehicle grille assembly according to claim 2, wherein
the body member, the first mounting member, the first stiffening arm and the third stiffening arm define a first open area; and
the body member, the second mounting member, the second stiffening arm and the fourth stiffening arm define a second open area.

8. The vehicle grille assembly according to claim 2, wherein
the body member, the third stiffening arm and the fourth stiffening arm define a substantially U-shaped area configured to receive a camera.

9. The vehicle grille assembly according to claim 1, wherein the outer grille member has a first locating member extending outwardly therefrom;
the cover member has a first locator opening receiving the first locating member; and
the first mounting member has a first locator opening receiving the first locating member, such that the cover member is disposed between the outer grille member and the bracket stiffening assembly.

10. The vehicle grille assembly according to claim 9, wherein
the outer grille member has a second locating member extending outwardly therefrom;
the cover member has a second locator opening receiving the second locating member; and
the second mounting member has a second locator opening receiving the second locating member, such that the cover member is disposed between the outer grille member and the bracket stiffening assembly.

11. The vehicle grille assembly according to claim 2, wherein
a fifth stiffening arm is connected to the first and second mounting members, the fifth stiffening arm being configured to extend around the perimeter portion of the outer grille member.

12. The vehicle grille assembly according to claim 1, wherein
the cover member has a mesh having a plurality of openings therein.

13. The vehicle grille assembly according to claim 1, wherein
the cover member includes at least one slat extending substantially parallel to the top and bottom ends thereof.

14. The vehicle grille assembly according to claim 1, wherein
the first and second stiffening arms extend from the body member in substantially opposite directions.

15. The vehicle grille assembly according to claim 1, wherein
the cover member is disposed between the outer grille member and the bracket stiffening assembly.

* * * * *